Sept. 7, 1943.  H. J. OSTERHOF  2,328,843
MAKING STRETCHED FILM
Filed Aug. 3, 1940
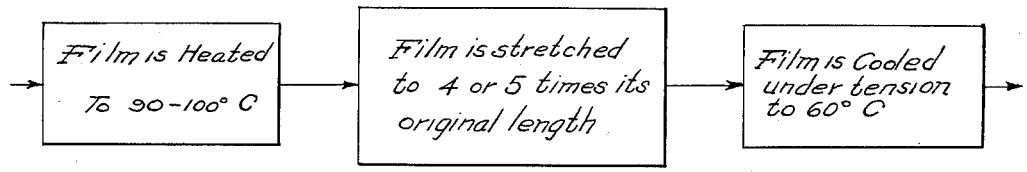
Process of Treating Rubber Hydrochloride Film
Inventor
Harold J. Osterhof
By
Attorney Patented Sept. 7, 1943

2,328,843

UNITED STATES PATENT OFFICE 2,328,843

MAKING STRETCHED FILM

Harold J. Osterhof, Cuyahoga Falls, Ohio, assignor to Wingfoot Corporation, Akron, Ohio, a corporation of Delaware Application August 3, 1940, Serial No. 351,169

2 Claims. (Cl. 18—57)

This invention relates to an improved method of making a stretched film from a thermostretchable material, which film is not affected by heating to low temperatures. The invention will be described more particularly as applied to the treatment of rubber hydrochloride film.

It has previously been suggested that cast rubber hydrochloride film can be improved in properties, particularly tensile strength, by heating and stretching. The stretched film is cooled under tension, and the tension is relieved when the film has been cooled to approximately room temperature. Minich application, Serial No. 350,624, filed August 3, 1940, describes a method of improving the properties of such a stretched film by heating it without tension after it has been cooled to room temperature. Minich heats the film, stretches it, cools it under tension and then again heats it without putting it under tension. Such film can be heated without shrinking. The Minich application explains that such a stretched film, if heated to the temperature X without tension after stretching, can thereafter be heated to any temperature not higher than the temperature X without causing the film to shrink. If heated above this temperature the film will shrink.

According to this invention the film is stretched and heated and then, instead of cooling it and again heating it as described in the Minich application, the film is simply cooled under tension to a temperature materially above room temperature. At this temperature the tension is released. The film is then allowed to shrink until it reaches equilibrium. Thereafter this film may be heated to any temperature up to that at which the tension was released without the film shrinking. For example, if rubber hydrochloride film or other thermo-stretchable film is heated and stretched and the film is then cooled and the tension is released at 60° C., the film may thereafter be heated up to 40 or 50 or 60° C. without shrinking. If it is heated above 60° C., it will shrink. Instead of cooling to 60° C., the film may be cooled to any temperature above 60° C., and at such temperature, the stretching tension will be released. The film will then ordinarily be allowed to cool to room temperature while not applying tension, although, of course, it is not necessary to cool the film to room temperature as it may be used at an elevated temperature.

Ordinarily the film will be heated to a temperature between about 90 and 100° C. in order to stretch it. It may be stretched to double its length or it may be stretched to four or five or more times its original length. A continuous sheet of the film may be stretched laterally or longitudinally, or it may be stretched first in one direction and then the other. The accompanying drawing is a flow sheet which illustrates the process.

There has been a commercial demand for sheets and ribbons formed by heating and stretching several plies of rubber hydrochloride film and then laminating the plies by pressing them together while still hot. Such laminated products are cooled under tension. The Minich application describes heating such laminated products without tension after cooling to improve their properties. According to the present invention, instead of cooling the laminated product to room temperature under tension and then heating it without tension, the laminated product, while still hot from the stretching and laminating operations, is cooled under tension to some elevated temperature such as 60° C. or higher and the tension is released at this temperature.

The rubber hydrochloride film may be an unplasticized film, or it may be plasticized. It may be colored with dyes and pigments. Ordinarily the films will be about .001 of an inch thick before stretching, although the invention is applicable to thicker and thinner sheets. The stretched sheet may, for example, be 0.0002 or 0.0003 inch thick or thicker. The stretched laminated sheet may be up to 0.0015 inch thick or much thicker.

Although the invention has been more particularly described as applied to the stretching of rubber hydrochloride film, it includes the stretching of other thermo-stretchable materials, such as cellulosic derivatives, including cellulose esters and synthetic sheet materials, such as plasticized vinyl polymers, etc.

I claim:

1. The improved method of producing a stretched sheet product capable of heating up to a temperature of about 60° C. without shrinking from thermo-stretchable sheet material which when in stretched condition at said temperature ordinarily tends to shrink, said method comprising heating said thermo-stretchable sheet material to a first elevated temperature substantially above 60° C. at which said material is capable of stretching to at least double its unstretched area, said first elevated temperature being at least about 90° C., and stretching the sheet material while so heated to at least double its unstretched area, then cooling the stretched sheet material under tension down to a second temperature substantially below said first elevated temperature but not below about 60° C., and then releasing the tension from the stretched sheet material at said second temperature.

2. The improved method of producing a stretched rubber hydrochloride film which comprises heating rubber hydrochloride film to a temperature of at least about 90° C. and stretching it to at least double its unstretched area and then cooling it over a substantial temperature range while maintaining it under tension and then before it cools to a temperature below 60° C. releasing the stretching tension.

HAROLD J. OSTERHOF.